C. L. KENNEDY.
COMBINED VEHICLE HUB AND SHOCK ABSORBER.
APPLICATION FILED MAR. 27, 1912.
1,041,097.
Patented Oct. 15, 1912.
2 SHEETS—SHEET 1.
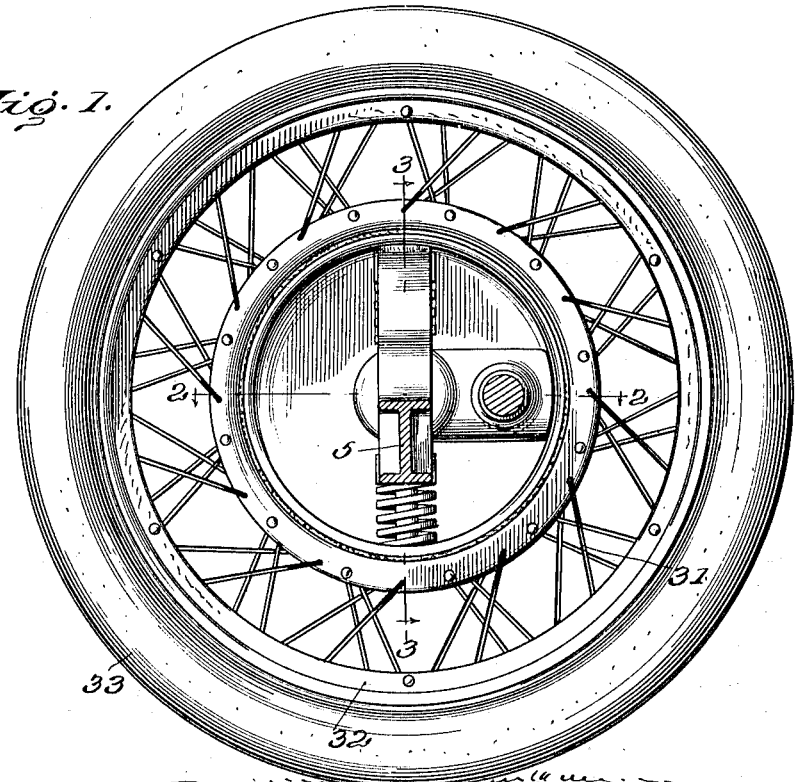
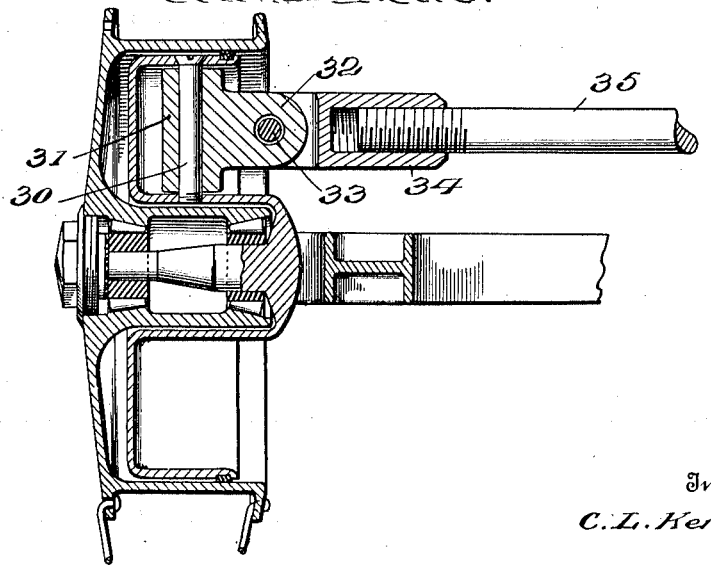
Witnesses
W. A. Williams
L. B. Baker
Inventor
C. L. Kennedy,
By Browne & Phelps
Attorneys

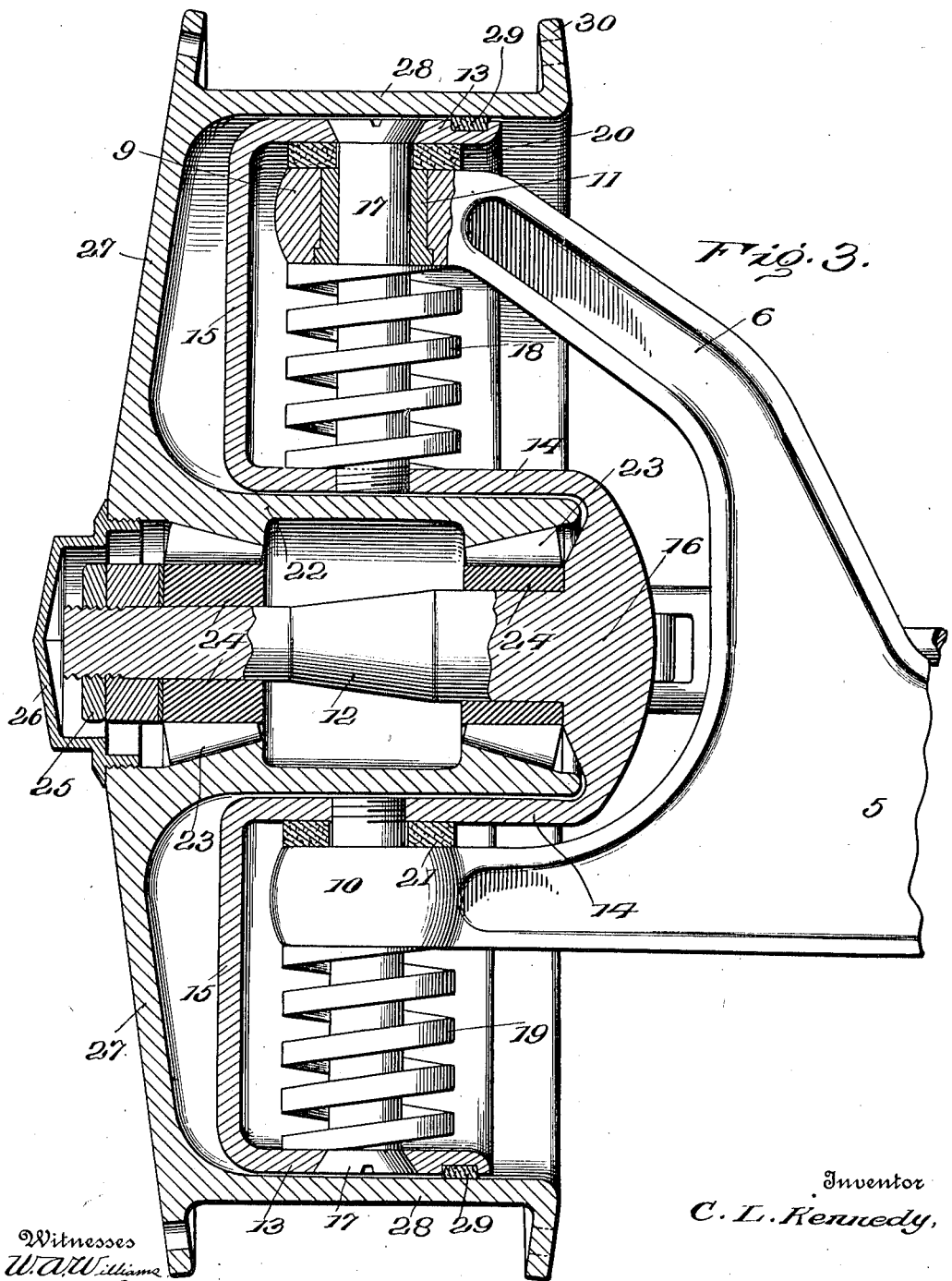

UNITED STATES PATENT OFFICE.

CHARLES L. KENNEDY, OF WINNIPEG, CANADA.

COMBINED VEHICLE-HUB AND SHOCK-ABSORBER.

1,041,097. Specification of Letters Patent. Patented Oct. 15, 1912.

Application filed March 27, 1912. Serial No. 686,600.

*To all whom it may concern:*

Be it known that I, CHARLES L. KENNEDY, a subject of the King of Great Britain, residing at Winnipeg, Canada, have invented certain new and useful Improvements in Combined Vehicle-Hubs and Shock-Absorbers, of which the following is a specification.

My invention relates to certain new and useful improvements in combined vehicle hubs and shock absorbers, and the object of my invention is to produce a device of this character particularly adapted for use in connection with automobiles, motor trucks and the like, which shall be simple and very strong in construction, efficient in operation and fully capable of withstanding the shocks and jars incident to its operation and use.

A further object of my invention is to produce a mounting for the hub which will act as a shock absorber, so that shocks and strains will not be transmitted to the frame of the vehicle.

A further object of my invention is to produce a hub of this character which shall be of the stub-axle type, and one in which the center of oscillation of the axle for the purpose of steering will be in the plane of the tread of the wheel and pass through the point of contact.

With these and other objects in view my invention consists in certain constructions, combinations and arrangements of parts the preferred form of which will be first described in connection with the accompanying drawings, and then the invention particularly pointed out in the appended claims.

Referring to the drawings wherein the same reference numeral is used to designate the same part wherever it occurs, Figure 1 is a side elevation of a wheel constructed in accordance with my invention, with the axle thereof in section; Fig. 2 is a section taken on line 2, 2 of Fig. 1 and Fig. 3 is a section on line 3, 3 of Fig. 1, drawn on an enlarged scale.

5 designates an axle having its ends formed into a yoke 6, the arms of which terminate in bored bosses 9, 10. The bore of each of these bosses is preferably provided with a lining 11 of any desired bearing-forming metal.

12 designates the stub axle which preferably, and as shown, extends from the center of a circular plate formed with an outer ring 13, an inner ring 14 connected by the flat portion 15 with the stub axle 12 extending from the middle of the central portion 16. By this construction there is provided an annular depression opening in one direction, a central depression opening in the opposite direction with the stub extending from the middle of the central depression.

17, 17 indicate a pair of bolts which extend through the side of the ring 13 across the annular depression and are threaded into the side of the ring 14, passing through the bore of the bosses 9 and 10 respectively, so that the plate is capable of vertical movement in relation to the axle 5. Interposed between the boss 9 and the side of the ring 14 is a spiral spring 18, and interposed between the boss 10 and the inner side of the ring 13 is a second spiral spring 19, whereby the parts are yieldingly held in the position best shown in Fig. 3, but when a pressure is applied to the stub axle 12 sufficient to overcome the tension of the springs the plate may move upwardly, compressing the springs, for the purpose of absorbing the shock. Preferably, and as shown, I insert a washer 20 formed of leather or the like between the boss 9 and the inner face of the ring 13, and a similar washer 21 between the boss 10 and the outer face of the ring 14 to prevent jar and noise when the springs are permitted to return the parts to the position shown in Fig. 3.

22 designates the hub proper of the wheel, which extends into the central depression in the plate and surrounds the stub axle. For the sake of illustration I have shown roller bearings 23 interposed between the hub and the stub axle with the bearing rings 24 mounted on the stub axle. I have also shown the hub as being held on the axle by means of the nut 25, the bearing and nut being protected from dust by a dust cap 26 threaded into the outer end of the bore of the hub.

The outer end of the hub is formed with a circular disk 27 extending therefrom, which disk at its periphery is formed with a flange 28 which extends around the outer ring 13 of the stub axle carrying plate concentric therewith and slightly spaced therefrom. In order to prevent dust entering into the space between the ring 13 and the flange 28 I have shown the ring as being provided with an annular projecting ring 29 formed of felt, or similar material, which contacts with the inner surface of the flange 28.

For the sake of illustration I have shown the opposite sides of the flange 28 as provided with the outwardly extending spoke-receiving flanges 30, into which one end of the spokes 31 are secured, the spokes carrying at their outer end the tire rim 32 on which a tire 33 is mounted. The particular construction of the wheel rim and entire wheel however form no part of my invention and are shown merely for the purpose of illustrating a complete wheel.

It will be noted that the stub axle and consequently the wheel turn upon the bolts 17 in the bosses 9 and 10, and it is also to be noted that the axis of oscillation passes through the point of contact of the tread of the wheel as will be seen from Fig. 1. The stub axle therefore, carrying the wheel, may be turned for the purpose of steering by the minimum power. In order to illustrate the steering means I have shown in Fig. 2 a bolt 30 passing through the ring 13 and threaded into the ring 14 on one side of the stub axle and in the horizontal plane of said axle. Journaled on the bolt 30 is a sleeve 31 from which projects a boss 32, to which is pivoted, by means of a vertical pivot 33, the end of a threaded sleeve 34 to which may be connected one end of a rod 35, the other end of the rod being connected with the steering mechanism. It is to be noted that the pivot 33 is at right angles to the bolt 30 and consequently a universal joint is effected between the steering rod 35 and the axle carrying disk.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

1. In a combined hub and shock absorber, the combination with an axle, of a pair of spaced bosses carried by the ends of the axle, a circular plate formed with an annular depression opening in one direction into which the bosses extend, and a central depression opening in the opposite direction, a stub axle extending from the center of the central depression, a pair of bolts connecting the opposite sides of the annular depression and passing through the bosses, a pair of springs, one surrounding each bolt, and interposed between one side of the boss and one side of the annular depression and a wheel hub mounted on the stub axle.

2. In a combined hub and shock absorber, the combination with an axle, of a pair of spaced bosses carried by the ends of the axle, a circular plate formed with an annular depression opening in one direction into which the bosses extend, and a central depression opening in the opposite direction, a stub axle extending from the center of the central depression, a pair of bolts connecting the opposite sides of the annular depression and passing through the bosses, a pair of springs, one surrounding each bolt and interposed between one side of the boss and one side of the annular depression, and a hub mounted on the stub axle and entering the central depression, a circular extension of the hub surrounding the periphery of said circular plate, a tread surface supported by the hub with the plane of the tread in line with the centers of said bolts.

In testimony whereof I affix my signature in presence of two witnesses.

CHARLES L. KENNEDY.

Witnesses:
C. W. KENNEDY,
THOS. D. ROBINSON.